United States Patent [19]  [11] Patent Number: 4,939,435
Takahashi et al.  [45] Date of Patent: Jul. 3, 1990

[54] TORQUE DETECTING APPARATUS

[76] Inventors: Tadashi Takahashi, 1415-7, Ishinazaka-cho, Hitachi-shi, Ibaraki 319-12; Syooichi Kawamata, 19-34, Namekawahon-cho 4-chome, Hitachi-shi, Ibaraki 317; Kunio Miyashita, 45-15, Nishinarusawa-cho 4-chome, Hitachi-shi, Ibaraki 316; Ryoosoo Masaki, 401, 17-1, Moriyama-cho 3-chome, Hitachi-shi, Ibaraki 316; Shigeru Kuriyama, 853-32, Tsuda, Katsuta-shi, Ibaraki 312, all of Japan

[21] Appl. No.: 340,682

[22] Filed: Apr. 20, 1989

[30] Foreign Application Priority Data

Apr. 22, 1988 [JP] Japan .................. 63-98146

[51] Int. Cl.$^5$ ................................. G01L 3/10
[52] U.S. Cl. ........................ 318/432; 318/2; 318/488
[58] Field of Search ............ 318/2, 430, 432, 433, 318/488, 675

[56] References Cited

U.S. PATENT DOCUMENTS 3,060,360  10/1962  Tomek ........................ 318/2 X
3,193,744   7/1965  Seward ...................... 318/675 X

FOREIGN PATENT DOCUMENTS 62-239031  10/1987  Japan .

Primary Examiner—Bentsu Ro

[57] ABSTRACT

First magnetic angular sensor outputs a sine-wave output and a cosine-wave output corresponding to positions of rotation of a rotary drum being fitted in a rotating drive shaft. Second magnetic angular sensor outputs a sine-wave output and a cosine-wave output corresponding to positions of rotation of another rotary drum being fitted on the rotating drive shaft. In case of the other output of the sine-wave output or the cosine-wave output of the first or the second magnetic angular sensor is varied while one output of the sine-wave output or the cosine-wave output in the first or the second magnetic angular sensor is not varied, the one output cosine-wave output or the sine-wave output of the first or the second magnetic angular sensor is determined to be a fault and an abnormality signal is delivered therefrom. The electric driven power steering apparatus having an assist torque means employed the magnetic angular sensor structure can be prevented in advance from the accident and high reliability thereor can be obtained.

34 Claims, 13 Drawing Sheets

TORQUE DETECTING APPARATUS

BACKGROUND OF THE INVENTION

The present invention relates to a torque detecting apparatus in which a fault of the torque detecting apparatus is detected, and more particularly to a torque detecting apparatus in which a relative shift of positions being caused by the torsion of a shaft is detected, or to a torque controlling apparatus for an electric driven power steering construction in a driving force assisting apparatus whose main component comprises a torque detecting apparatus.

Conventional torque detecting apparatuses are constructed so that the outputs are obtained from each of the magnetic sensors respectively corresponding to the angles of rotation of the rotary drums fitted to the opposite ends of the rotating drive shaft and the phase difference signals from these magnetic sensors are processed to determine torque by an executing circuit, as shown in Japanese Patent Laid-Open No. 239031/1987 for example.

In the prior art stated above, no consideration is given to a method of detecting a torque when the rotating drive shaft stops, and further no consideration is given at all to a of the magnetic sensors such as a wire a break-down and a short circuit which produces a problem in that the fault cannot be detected.

SUMMARY OF THE INVENTION

An object of the present invention is to provide a torque detecting apparatus wherein a fault of a position detecting means itself such as a magnetic angular sensor can be detected easily.

Another object of the present invention is to provide a torque detecting apparatus wherein a fault in electric wiring of a position detecting means such as a magnetic angular sensor can be detected easily.

A further object of the present invention is to provide a torque detecting apparatus wherein an abnormality signal of a position detecting means such as a magnetic angular sensor can be sent to a system so as to protect the torque detecting apparatus.

A further object of the present invention is to provide a torque detecting apparatus wherein an abnormality signal of a position detecting means such as a magnetic angular sensor can be sent to a system such as an electric driven power steering assist construction so as to protect the system.

A further object of the present invention is to provide a torque detecting apparatus wherein an abnormality signal of a position detecting means such as a magnetic angular sensor can be sent to a system such as an electric driven power steering assist construction so as to prevent an unexpected or undesirable operation of the system.

In accordance with the present invention, a torque detecting apparatus comprises a first rotary body being fitted on a drive side on a rotating drive shaft, a second rotary body being fitted on a load side on said rotating drive shaft, a first position detecting means being disposed opposed to and facing the first rotary body, a second position detecting means being disposed opposed to and facing the second rotary body, the first position detecting means generates a first output and a second output corresponding to positions of rotation of the first rotary body, the second position detecting means generates a third output and a fourth output corresponding to positions of rotation of the second rotary body, and a torque determining means for executing a first angle from the first output of the first rotary body and the second output of the first rotary body and for executing a second angle from the third output of the second rotary body and the fourth output of the second rotary body and further for determining a torque from a phase difference between the first angle and the second angle.

The torque detecting apparatus comprises further a determining and outputting means for determining a fault and for outputting an abnormality signal, when one of the first and second outputs in the first rotary body is determined to be faulty case, the other output of the first and second outputs in the first rotary body is varied while the one of the first output and second outputs in the first rotary body is not varied.

The torque detecting apparatus comprises further a determining and outputting means for determining a fault and for outputting an abnormality signal when one of the third and fourth outputs in the second rotary body is determined to be the faulty case, the other output of the third outputs and fourth outputs in the second rotary body is varied while the one of the third output and the fourth outputs in the second rotary body is not varied.

The torque detecting apparatus has the first position detecting means and the second position detecting means disposed opposite to the first rotary body and the second rotary body as fixed respectively on the drive side and the load side on the rotative drive shaft. A plurality of signals are outputted from the first position detecting means and the second position detecting means.

Since these outputted signals are varied in accordance with the rotation of the first rotary body and the second rotary body, the positions of rotation of the two rotary bodies can be determined from the amplitude of these output signals. Since the rotational positions of the two rotary bodies are known in this way, a difference between these positions, i.e. an angular difference, turns out to be a torsion angle, and thus torque can be detected therefrom.

Now, when a plurality of output signals of each rotary body are checked and it is found that only one output signal is not varied while others are varied, the one output signal can be determined to be faulty. A fault can be detected quickly, in this way, by checking the plurality of output signals obtained from the first and the second rotary bodies.

According to the present invention, any fault of the torque detecting apparatus can be detected easily. Therefore, since any abnormality and fault in the torque detecting apparatus can be detected, unexpected or undesirable operation of the torque detecting apparatus is prevented and thus high safety in the torque detecting apparatus can be secured.

Further, any fault in a torque controlling apparatus for an electric power assist construction is detected easily when an assist torque means such an electric motor is cut off from a rotating drive shaft. Therefore, an unexpected or an undesirable operation of the torque controlling apparatus is prevented and thus high safety in the torque controlling apparatus can be secured.

DESCRIPTION OF THE INVENTION

One embodiment of a torque detecting apparatus will be explained according to the present invention.

Figure 1:
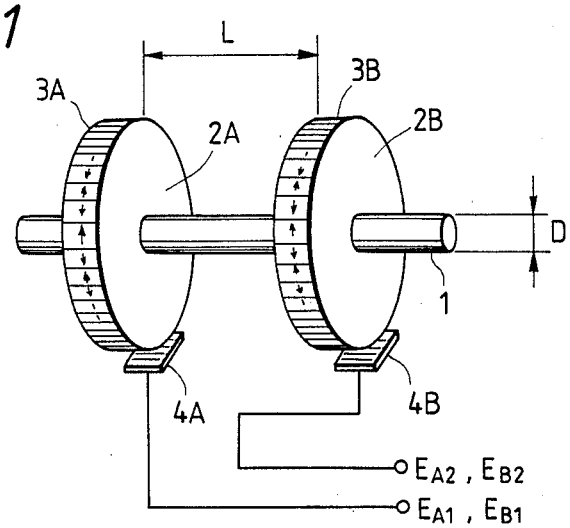
FIG. 1 is a schematic structural view of one embodiment of a torque detecting apparatus according to the present invention.

In FIG. 1, a rotating drive shaft 1 has rotary drums 2A and 2B at both end portion. The rotating drive shaft 1 serves also as a drive shaft The rotary drums 2A and 2B have magnetic substances 3A and 3B whereon magnetic signals N-S are recorded are fixed separately by a gap L on the rotating drive shaft 1.

Magnetic angular sensors 4A and 4B are constructed of magneto-resistance effect elements (hereinafter called as MR elements). These magnetic angular sensors 4A and 4B face the rotary drums 2A and 2B respectively and are disposed with a small gap therefrom. A description will be made hereupon in respect to the operations of the rotary drums 2A and 2B and the magnetic angular sensors 4A and 4B by using FIG. 2.

Figure 2:
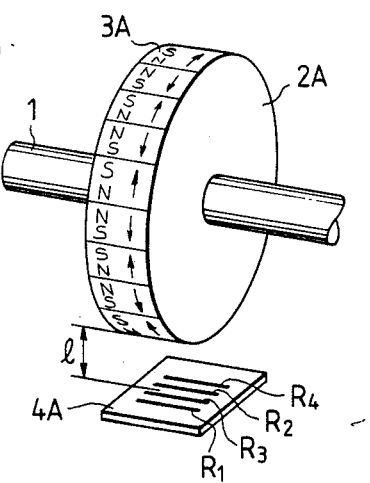
FIG. 2 is a detailed view of a rotary drum and a magnetic angular sensor constituting a torque detecting apparatus.

FIG. 2 shows the rotary drum 2A and the magnetic angular sensor 4A taken out for explaining the operations. As mentioned above, the magnetic signals of N and S are recorded on the whole circumference of the magnetic substance 3A of the rotary drum 2A, and the magnetic angular sensor 4A constructed of MR elements $R_1$, $R_2$, $R_3$ and $R_4$ is disposed oppositely thereto with the small gap l therefrom.

Figure 3A:
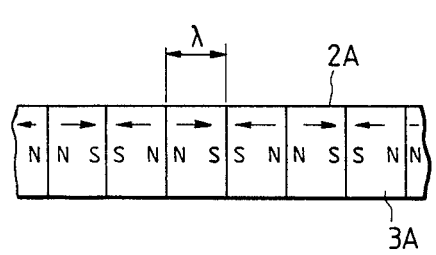
FIG. 3A is a developed view of a magnetic substance of a rotary drum.
Figure 3B:
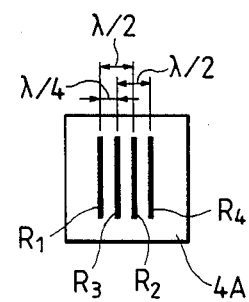
FIG. 3B is a plan view of a magnetic angular sensor in relation to a magnetic substance of a rotary drum.

FIG. 3A and FIG. 3B are enlarged developed views showing the relationship in disposition between the magnetic substance 3A on the rotary drum 2A and the magnetic angular sensor 4A, which are shown in FIG. 2. In FIG. 3B, the MR elements $R_1$, $R_3$, $R_2$ and $R_4$ are disposed separately by $\gamma/4$ relation to a magnetic recording wavelength (a gap between an N-pole and an S-pole) $\gamma$.

Figure 4:
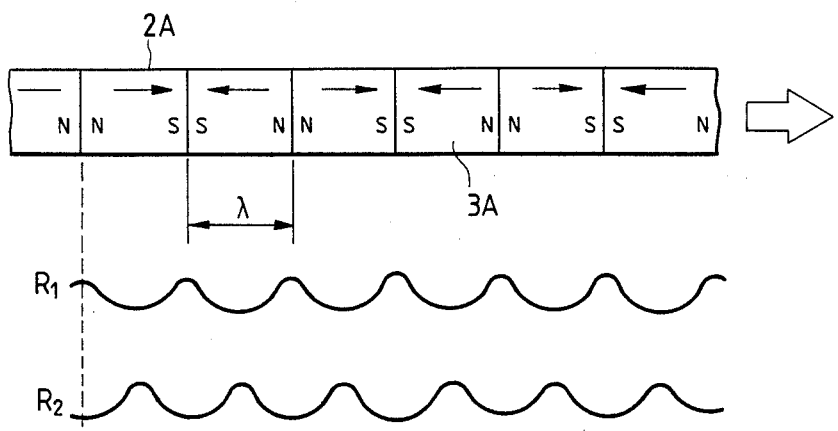
FIG. 4 is an illustration of magnetic poles recorded on a magnetic substance of a rotary drum and of outputs of the torque sensor.

FIG. 4 shows the operating waveforms of the MR elements. In FIG. 4, the magnetic substance 3A of the rotary drum 2A moves as indicated by an arrow mark shown in the figure, with the rotation of the rotary drum 2A. On the other hand, the MR elements $R_1$ and $R_2$ have a characteristic that the resistance value thereof lowers when either one signal of magnetic flux variation of the N-pole and the S-pole of the magnetic signals is applied thereto, as is known well.

When the magnetic substance 3A moves as indicated by the arrow mark, therefore, the changes of resistances of the MR elements $R_1$ and $R_2$ are obtained in accordance with the recording wavelength $\gamma$, and the change of resistance of each MR element has a waveform shifted in phase by $\gamma/2$ from that of the other.

Figure 5:
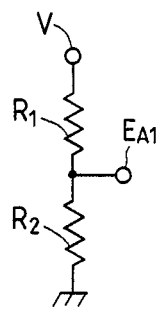
FIG. 5 is a connection diagram of a three-terminal contact of magnetro-resistance effect elements.
Figure 6A:
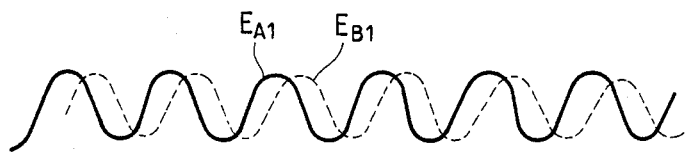
FIG. 6A is a diagram of output waveforms obtained from a middle point of a three-terminal contact.

The MR elements $R_1$ and $R_2$ are connected in series as shown in FIG. 5, and an output terminal $E_{A1}$ is taken out from the middle point of the MR elements and connected to three-terminals including the output terminal $E_{A1}$. When a voltage V is applied to the opposite both ends, a voltage obtained then from the output terminal $E_{A1}$ has a waveform as shown in FIG. 6A, and thus an output $E_{A1}$ corresponding to the magnetic signal recorded on the magnetic substance 3A can be obtained. The MR elements $R_3$ and $R_4$ are shifted by $\gamma/4$ from the MR elements $R_1$ and $R_2$, and therefore an output $E_{B1}$ being different in phase by 90 degrees from the output $E_{A1}$ is obtained likewise from the MR elements $R_3$ and $R_4$.

Figure 6B:
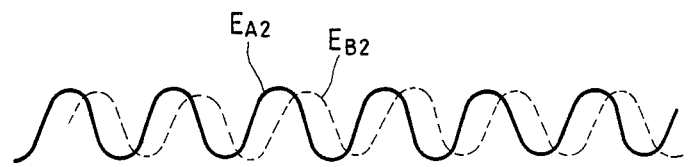
FIG. 6B is a diagram of output waveforms obtained from a middle point of a three-terminal contact.

Besides, waveforms or outputs $E_{A2}$ and $E_{B2}$ shown in FIG. 6B are obtained likewise from the rotary drum 2B and the magnetic angular sensor 4B of FIG. 1 by the same operation.

When a motor is fitted on the drive side of the rotating drive shaft 1 and a load on the load side thereof, for instance, in the torque detecting apparatus of FIG. 1, the rotating drive shaft 1 is twisted by an angle $\theta$ in proportion to a load torque given thereto. This relationship is expressed by the following equation.

$$\theta = \frac{32}{\pi \cdot G} \times \frac{L}{D^4} \times T \qquad (1)$$

Herein mark $\theta$ denotes a torsion angle (rad), G a shear coefficient (kg/cm$^2$) of the rotating drive shaft 1, L a distance (cm) between the rotary drums 2A and 2B, and D the diameter (cm) of the rotating drive shaft 1. The shear coefficient G is determined by the material of the rotating drive shaft 1, and so a torque T in relation to the torsion angle $\theta$ is found when the distance L between the rotating drums 2A and 2B and the diameter D of the rotary drive shaft 1 are set. Accordingly, the measurement of the torque is enabled by detecting the torsion angle $\theta$ of the rotating drive shaft 1.

Figure 7A:
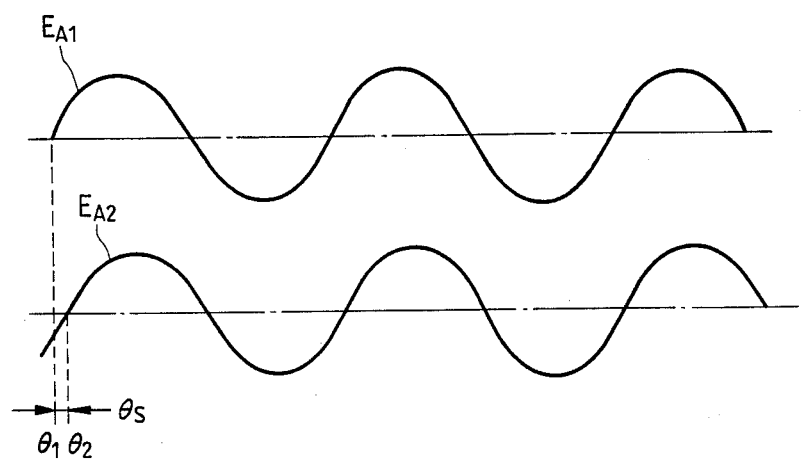
FIG. 7A is diagrams for a method of detecting a load torque on the basis of the same output waveforms obtained from a magnetic angular sensor.
Figure 7B:
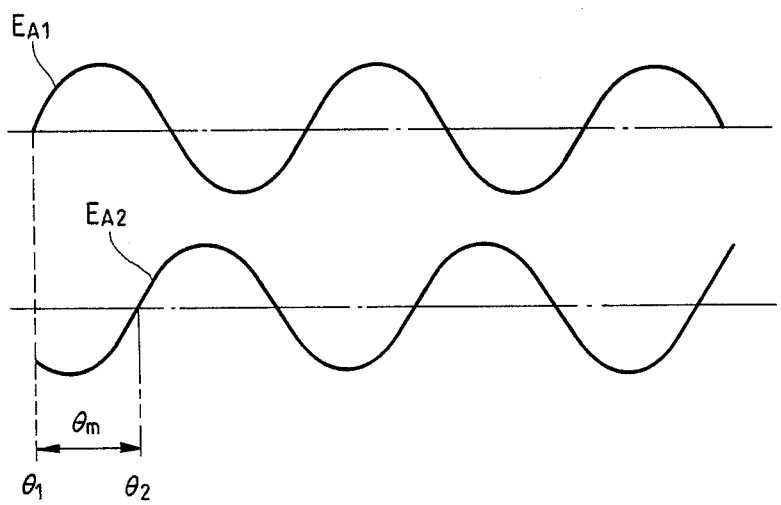
FIG. 7B is diagrams for a method of detecting a load torque on the basis of the same output waveforms obtained form a magnetic angular sensor.

One example of a method for measuring the torsion angle $\theta$ of the rotating drive shaft 1 is shown in FIG. 7A and FIG. 7B. In FIG. 7A, the torsion 8 of the rotating drive shaft 1 is found by measuring a phase difference ($\theta_2-\theta_1$) at the zero cross of the magnetic angular sensor 4A and the output $E_{A2}$ obtained from the rotary drum 2B and the magnetic angular sensor 4B.

As shown in FIG. 7A, in other words, the amount of the torsion of the rotating drive shaft 1 is small when the load torque is small, and therefore a phase difference $\theta_s$ at the zero cross of the outputs $E_{A1}$ and $E_{A2}$ turns to be small as well.

In the case when the load torque is large as shown in FIG. 7B, to the contrary, the amount of the torsion of the rotating drive shaft 1 is also increased, and therefore a phase difference $\theta_m$ at the zero cross turns to be large. Accordingly, the amplitude of the torque can be detected by measuring this phase difference $\theta_s$ or $\theta_m$.

While the phase difference at the zero cross of the signals of the outputs $E_{A1}$ and $E_{A2}$ of the magnetic angular sensors 4A and 4B is determined in the example of FIG. 7, the torque can be detected also in a place other than the zero cross. When the outputs $E_{A1}$ and $E_{B1}$, and the outputs $E_{A2}$ and $E_{B2}$ are sine waves, the angles of the magnetic drums can be measured from the amplitudes of the sine waves respectively, and therefore the torque can be measured with high resolution by finding the difference between the angles of the rotary drums 4A and 4B.

Figure 8A:
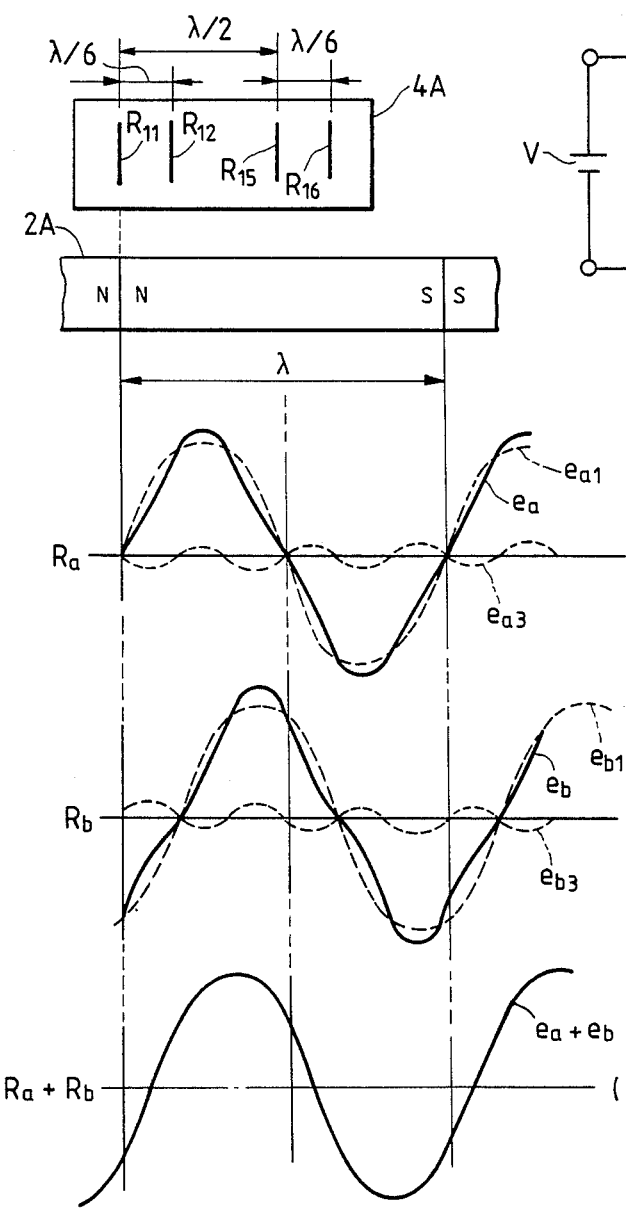
FIG. 8A is diagrams of one embodiment of a magnetic angular sensor of the present invention for obtaining sine-wave outputs.
Figure 8B:
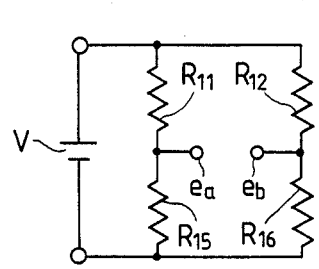
FIG. 8B is a connection diagram of magnetro-resistance effect elements.

FIG. 8A and FIG. 8B are illustrations of the principle on the basis of which sine waves are obtained by the magnetic angular sensor 4A of MR elements. Magnetoresistance effect elements (MR elements) $R_{11}$ and $R_{15}$, and MR elements $R_{12}$ and $R_{16}$ of the magnetic sensor 4 are disposed separately by $\gamma/2$ in relation to a recording wave $\gamma$, while the MR elements $R_{11}$ and $R_{12}$, and the MR elements $R_{15}$ and $R_{16}$, are disposed separately by $\gamma/6$ from each other, respectively.

Since the MR elements $R_{11}$, $R_{12}$, $R_{15}$ and $R_{16}$ are connected in such a disposition as shown in FIG. 8B, an output $e_a$ obtained from the MR elements $R_{11}$ and $R_{15}$ turns to be one as indicated by a solid line $e_a$ of FIG. 8A when the rotary drum 2A rotates.

This waveform distortion occurs because the change of resistance of the MR element is saturated in relation to a magnetic field. Therefore the main component of this distorted wave is a tertiary harmonic, and the wave can be separated into a fundamental wave $e_{a1}$ and the tertiary harmonic $e_{a3}$ as indicated by broken lines in FIG. 8A.

An output $e_b$ obtained from the MR elements $R_{16}$ and $R_{12}$ is turned also into a fundamental wave $e_{b1}$ and a tertiary harmonic $e_{b3}$. When a bridge output $(e_a+e_b)$ i.e., the output $E_{A1}$, shown in a connection diagram is considered, the tertiary harmonics $e_{a3}$ and $e_{b3}$ are reverse in phase to each other and canceled by each other consequently, and thus only the fundamental wave is obtained.

Figure 9:
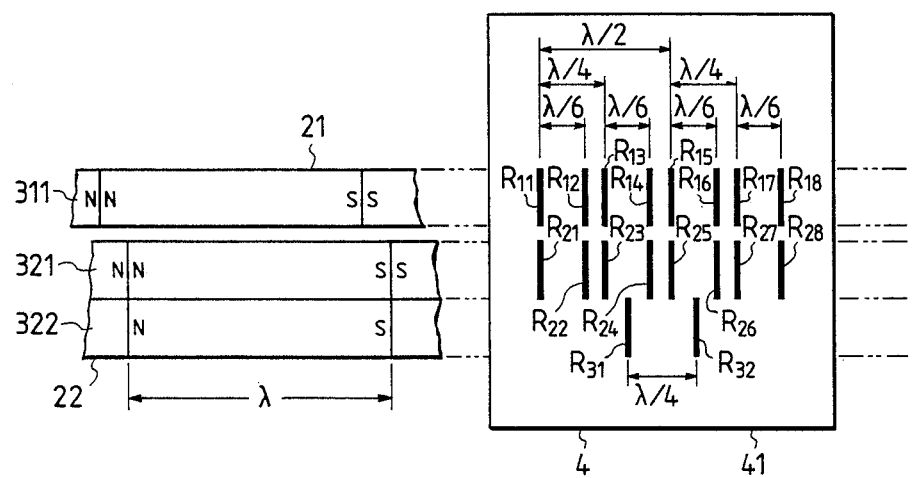
FIG. 9 is a developed view of a rotary drum and a magnetic angular sensor of another embodiment of the present invention.

FIG. 9 is a developed view of a magnetic substance of a rotary drum and a magnetic angular sensor of one embodiment wherein the magnetic angular sensor outputting a sine wave is employed for the torque sensor.

A base 41 is formed of a glass material or the like and bearing MR elements A rotary drum 21 on the drive side is provided with a magnetic track 311 of a magnetic substance, whereon magnetic signals of N-S are recorded successively at a recording pitch $\gamma$. There are two magnetic tracks 321 and 322 on a rotary drum 22 on the load side, and magnetic signals of the recording pitch $\gamma$ are recorded on magnetic track 321 successively in the same way as on the magnetic track 311 of the rotary drum 21.

On the magnetic track 322, only one magnetic signal of the recording pitch $\gamma$ is recorded. On a magnetic angular sensor 4 facing the rotary drums 21 and 22, MR elements $R_{11}$-$R_{18}$ and $R_{21}$-$R_{28}$ are disposed as shown in the figure. Namely, for the rotary drum 21, MR elements $R_{11}$-$R_{18}$ are disposed for the rotary track 321, and MR elements $R_{21}$-$R_{28}$ are disposed for the magnetic track 321 of the rotary drum 22. Moreover, MR elements $R_{31}$ and $R_{32}$ are disposed for the magnetic track 322.

Besides, the MR elements $R_{11}$ and $R_{12}$, $R_{13}$ and $R_{14}$, $R_{15}$ and $R_{16}$, $R_{17}$ and $R_{18}$, $R_{21}$ and $R_{22}$, $R_{23}$ and $R_{24}$, $R_{25}$ and $R_{26}$, and $R_{27}$ and $R_{28}$, are disposed separately by $\gamma/6$ from each other, respectively, while the MR elements $R_{11}$, $R_{13}$, $R_{15}$, $R_{17}$, and $R_{21}$, $R_{23}$, $R_{25}$, $R_{27}$, and further $R_{31}$, $R_{32}$, are disposed separately by $\gamma/4$ from each other, respectively.

The magnetic angular sensor has at least four sets of a first MR element array having MR elements and a second MR element array having MR elements disposed separately by an electrical angle of $n\pm\gamma/6$ (n: an integer) from each other respectively, and a third MR element array having MR elements delivering a reference signal. The respective two sets of the first MR element array and the second MR element array are disposed separately by an electric angle of $n\pm\gamma/6$ from each other. The two sets of the first MR element array and the second MR element array are disposed separately by each other by $n\pm\gamma/6$ from each other being spaced by an electrical angle of $n\pm\gamma/6$ from the other two sets of MR element arrays.

Figure 10:
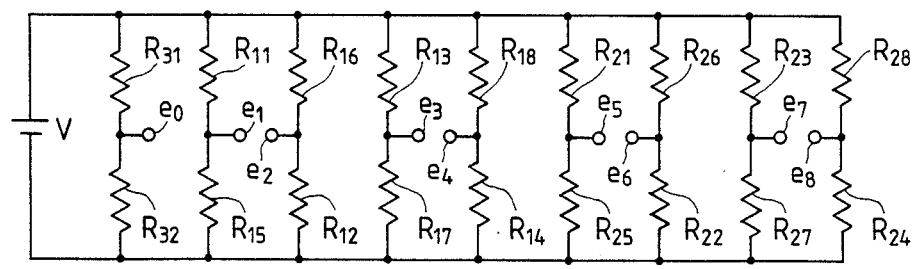
FIG. 10 is a connection diagram of the magnetic angular sensor of FIG. 9.

These MR elements are connected in such a manner as shown in FIG. 10, so as to obtain outputs $e_0$-$e_8$ therefrom. The outputs $e_1$-$e_2$, $e_3$-$e_4$, $e_5$-$e_6$ and $e_7$-$e_8$ of bridges formed by the MR elements $R_{11}$, $R_{12}$, $R_{15}$ and $R_{16}$, $R_{13}$, $R_{14}$, $R_{17}$ and $R_{18}$, $R_{21}$, $R_{22}$, $R_{25}$ and $R_{26}$, and $R_{23}$, $R_{24}$, $R_{27}$ and $R_{16}$, have the same constructions as that in FIG. 8, and sine-wave outputs are obtained therefrom The output formed by the MR elements $R_{31}$ and $R_{32}$ is provided for obtaining an output of one pulse in one rotation, which is used as a reference position signal.

Figure 11:
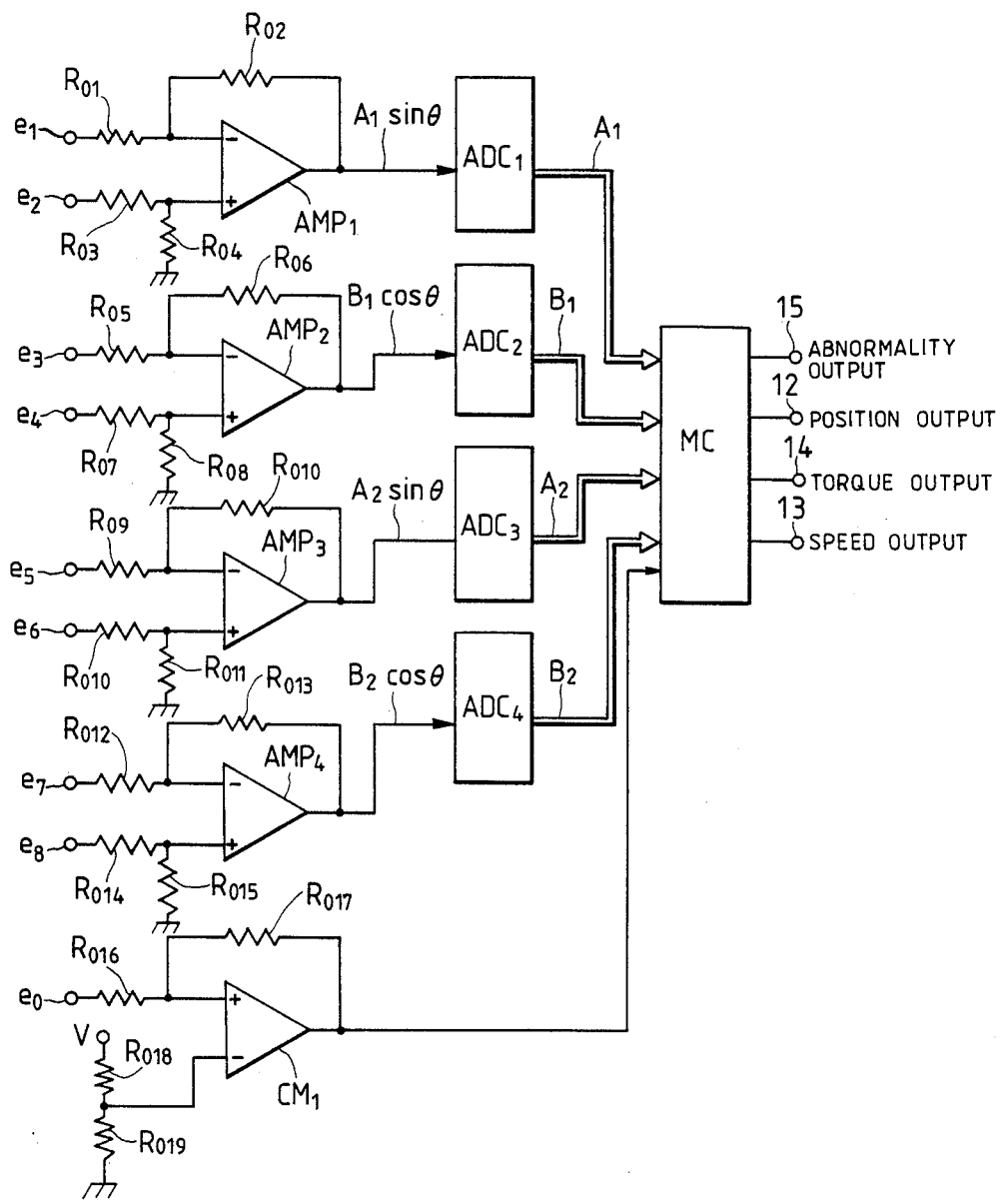
FIG. 11 is a circuit construction diagram for an electric driven power steering construction according to the present invention.

These outputs $e_0$-$e_8$ are amplified by processing circuits shown in FIG. 11, subjected to analog-digital conversion and taken in a microcomputer (MC) so as to perform the computation of a torque.

FIG. 11 shows a construction wherein differential amplification is conducted by fixed resistors $R_{01}$-$R_{04}$ and an amplifier $AMP_1$, and an output thereof is inputted to an analog-digital converter $ADC_1$. Four sets of the same constructions are employed and four kinds of voltages $e_1$-$e_2$, $e_3$-$e_4$, $e_5$-$e_6$ and $e_7$-$e_8$ being equivalent to the output voltages $E_{A1}$, $E_{B1}$, $E_{A2}$ and $E_{B2}$ of FIG. 6 are inputted to the respective inputs thereof, while outputs $A_1$, $B_1$, $A_2$ and $B_2$ are delivered therefrom. Four sets of signals $A_1$, $B_1$, $A_2$ and $B_2$ converted by $ADC_1$-$ADC_4$ are inputted to the microcomputer (MC) respectively.

The reference signal $e_0$ of one rotation is passed through a comparator ($CM_1$) and an output pulse thereof is inputted to the microcomputer (MC). A position information, a speed information, a torque output, etc., which are computed on the basis of the reference position signal in the microcomputer (MC), are outputted respectively from output terminals 12, 13 and 14 to send the signals to a system.

Moreover, an abnormality signal is outputted from an output terminal 15 in the case of the torque sensor being faulty, on which a description will be made later. In the microcomputer (MC), an arithmetic operation is executed in conformity with a flow-chart to be shown in FIG. 12, and an output being proportional to a torque is presented to the output terminal 14.

Figure 12:
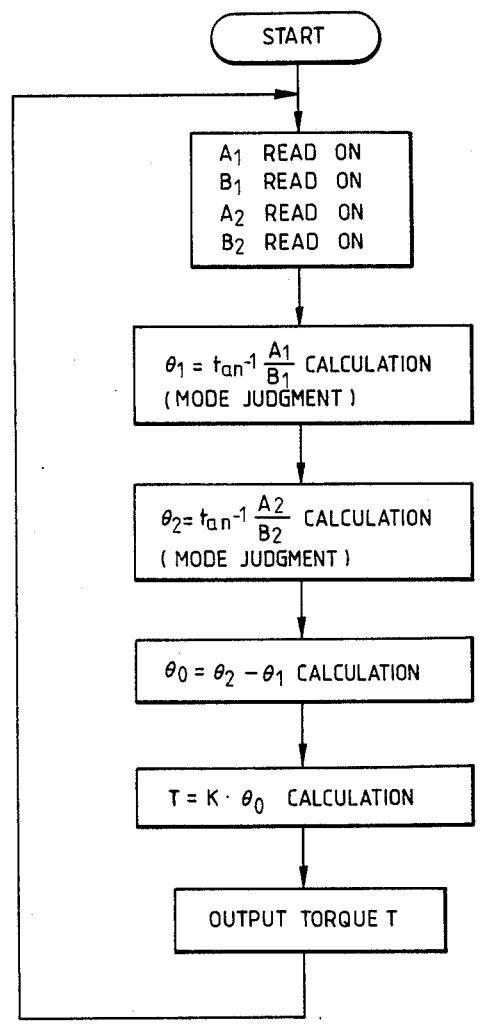
FIG. 12 is a flow-chart for calculating a torque according to the present invention.

According to the flow-chart of FIG. 12, first the outputs of the magnetic angular sensors 4A, 4B are amplified and then subjected to A/D conversion, and digital values $A_1$, $B_1$, $A_2$, $B_2$ thus obtained are read in. Next, such a execution as expressed by the following equation is executed by using $A_1$ and $B_1$, so as to find an angle $\theta_1$ of the rotary drum 2A.

$$\theta_1 = \tan^{-1}\left(\frac{A_1}{B_1}\right) \quad (2)$$

The plus and minus of $A_1$ and $B_1$ are discriminated herein, the mode thereof is determined, and the value of $\theta_1$ is decided.

The angle $\theta_2$ of the rotary drum 2B is calculated likewise on the basis of the inputs $A_2$ and $B_2$ by the following equation.

$$\theta_2 = \tan^{-1}\left(\frac{A_2}{B_2}\right) \quad (3)$$

Next, an angular difference between the rotary drums 2A and 2B, i.e. a torsional angle $\theta_0$, is calculated from the difference between the angles $\theta_1$ and $\theta_2$, and a torque T is calculated by the following equation obtained by transformation of the equation (1).

$$T = \frac{\pi \cdot G \cdot D^4}{32 \cdot L} \times \theta_0 \quad (4)$$

Then, the torque T is outputted and a return is made to the initial state. Herein the value $\theta_1$ of the equation (2) can be calculated by using only $A_1$ or $B_1$, as expressed by an equation (5). The outputs $A_1$ and $B_2$ are varied simultaneously, $$\theta_1 = \sin^{-1}(A_1) = \cos^{-1}(B_1) \quad (5)$$

however, when the outputs of the magnetic angular sensors 4A and 4B are varied due to a change in a small gap (spacing) between the rotary drum 2A or 2B and the magnetic angular sensor 4A or 4B, or the like, and therefore the accuracy can be made higher by such a division of $A_1$ by $B_1$ as expressed in the equation (2).

Figure 13:
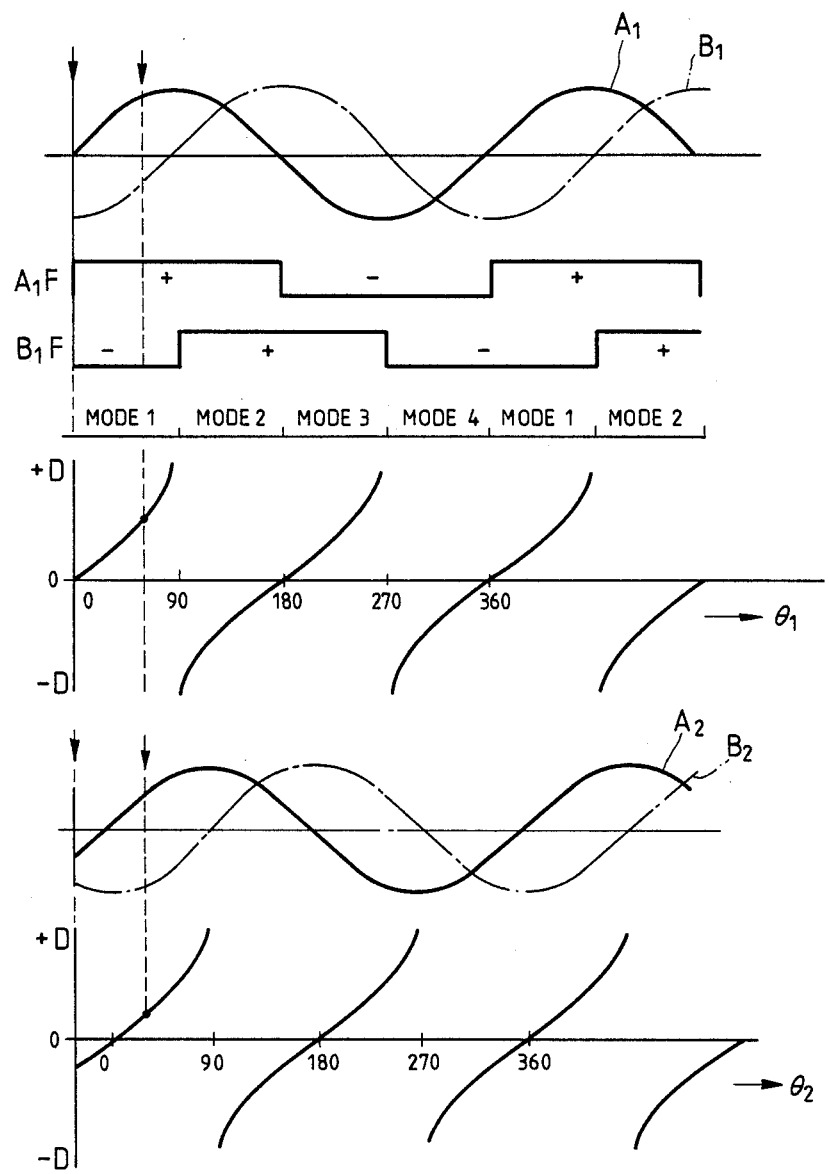
FIG. 13 is an illustration for explaining an operation for an electric driven power steering construction according to the present invention.

FIG. 13 shows an operation according to the flow-chart of FIG. 12. The signals $A_1$ and $B_1$, which are obtained from the MR elements $R_{11}$-$R_{18}$ constituting the first magnetic angular sensor and are inputted to the microcomputer (MC), are a sine wave and a cosine wave as shown in FIG. 13.

When the plus and minus of signal $A_1$ and signal $B_1$ are determined, first, they are divided as indicated by signal $A_{1F}$ and signal $B_{1F}$. If signal $A_{1F}$ and signal $B_{1F}$ are regarded as signals of 2 bits, they can be divided into four modes shown in FIG. 13.

Besides, the relationship between a value D obtained by dividing the sine wave $A_1$ by the cosine wave $B_1$ and the angle $\theta_1$ is as shown in FIG. 13, and the value thereof turns out to be $\infty$ at each angle of $\pm 90$ degrees and each angle 180 degrees.

Regarding the signals $A_2$ and $B_2$ obtained from the MR elements $R_{21}$-$R_{28}$ constituting the second magnetic sensor, such a relationship between the angle $\theta_2$ and the value D as shown in FIG. 13 can be obtained also just in the same way. Although the value D of $A_1/B_1$ is the same at two points between 0° and 360°, the angle thereof can be discriminated because of a difference in a mode.

Now, when the angles $\theta_1$ and $\theta_2$ are determined from the outputs of the first and second magnetic sensors at a point (a), $\theta_1 = 0$ and $\theta_2 = -30$ degrees, and accordingly the angular difference between them is $(\theta_1-\theta_2)=30$ degrees. A torque corresponding thereto can be calculated from the equation (4). When the angles are measured likewise at a point (b) after a certain time passes from the point (a), $\theta_1 = 60$ degrees and $\theta_2 = 30$ degrees, thus the angular difference $(\theta_1-\theta_2)$ turning to be 30 degrees. Accordingly, the same torque can be detected at any points on condition that the torque is fixed.

Figure 14:
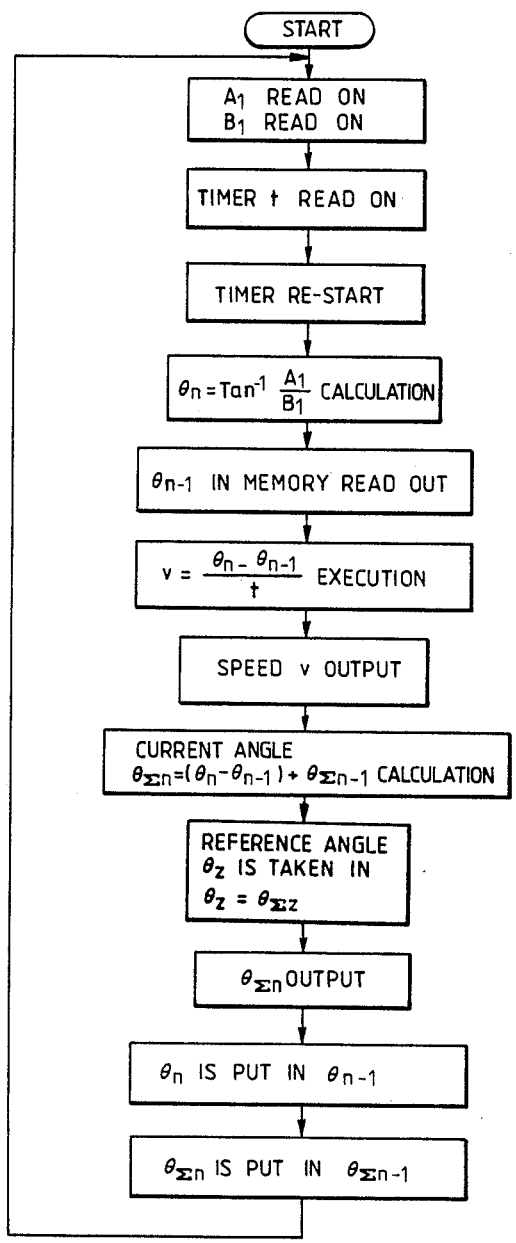
FIG. 14 is a flow-chart of detection of a speed and a position of the other embodiment for an electric driven power steering construction according to the present invention.

FIG. 14 is a flow-chart for detecting a rotational position and a rotational speed. First the digital inputs $A_1$ and $B_1$ of sine waves are taken in, a time t of a timer for measuring a speed is read and stored temporarily, and then the timer is re-started. Next, the minute angle $\theta_1$ within one cycle is obtained by the calculation according to the equation (2) in the same way as in the detection of torque.

Then, a minute angle $\theta_{n-1}$ obtained previously is read out of a memory, a difference between this angle and the present angle $\theta_n$ is calculated to find a change $(\theta_{n-1}-\theta_n)$ in the angle the value thus found is divided by the time difference t between the previous and present angles stored temporarily before, so as to calculate a speed v, and this is outputted to an output terminal 13.

As for the calculation of a position, the accumulation $\theta_{\Sigma n-1}$ of angles obtained till the preceding time is added to the difference between the present minute angle $\theta_n$ and the previous minute angle $\theta_{n-1}$, so as to calculate the current angle $\theta_{\Sigma n}$. Next, the reference position signal is taken in, and when there comes any signal, the current angle $\theta_n$ is altered to $\theta_{\Sigma n}$ so as to be matched with a reference value.

Then, the value $\theta_{\Sigma n}$ is outputted to an output terminal 12. Subsequently the present minute position $\theta_n$ is put in the memory of $\theta_{n-1}$, while the current angle $\theta_n$ is put in the previous angle $\theta_{n-1}$, and a return is made to the start. The foregoing description relates to an example wherein the minute angle $\theta_n$ and the previous minute angle $\theta_{n-1}$ are found within one cycle, and when the angle is varied beyond one cycle, calculation is conducted by using the cumulation of angles.

Figure 15:
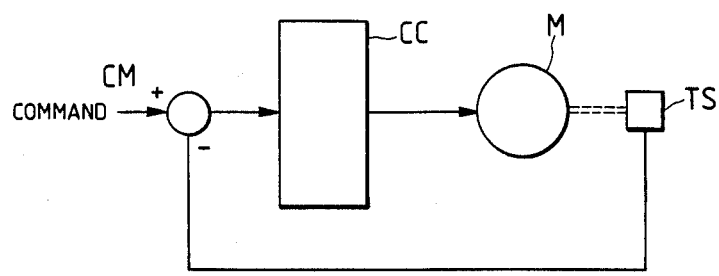
FIG. 15 is a structural view of a torque controlling apparatus using the torque sensor according to the present invention.

FIG. 15 shows a torque controlling apparatus wherein the present torque sensor is employed A comparison is made between a torque instruction value (CM) and an output of a torque sensor (TS), and an electric current applied to a motor (M) and the direction of rotation thereof are controlled by a control circuit (CC) in accordance with a value obtained from the comparison. This is one example wherein an output of the motor (M) is detected by the torque sensor (TS) and checked and compared with the torque instruction value (CM).

Figure 16:
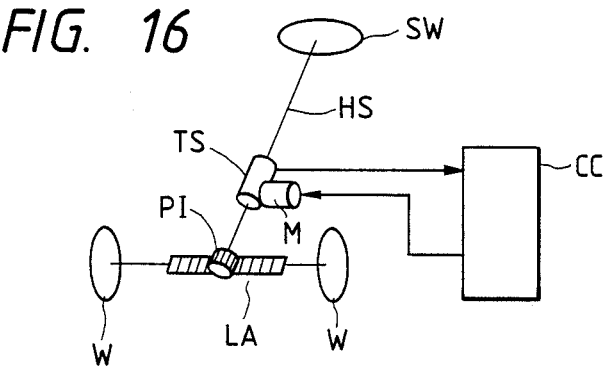
FIG. 16 is a schematic structural view another embodiment of an electric driven power steering assisting apparatus for an automobile according to the present invention.

FIG. 16 shows a driving force assisting apparatus using the torque sensor (TS), which is an electric drive power assist steering apparatus in an automobile.

The electric driven power assist steering apparatus has a construction wherein the torque sensor (TS) of FIG. 1 is fitted to a steering wheel shaft (HS), which is the shaft of a steering wheel (SW), the steering wheel (SW) is provided on the drive side while the torque of the motor (M) is transmitted onto the load side, and a wheel (W) is steered through the intermediary of a pinion gear (PI) and a rack gear (LA) provided at the fore end of the steering wheel shaft (HS).

When a driver operates the steering wheel (SW) and thereby a torque is given to the torque sensor (TS), this torque is detected according to an instruction, and a current or a direction of rotation matched with the torque is outputted by a control circuit (CC) so as to drive the motor (M). The torque of the motor (M) is transmitted for steering through the pinion gear (PI) and the rack gear (LA), sc as to compensate the power of the driver.

Figure 17:
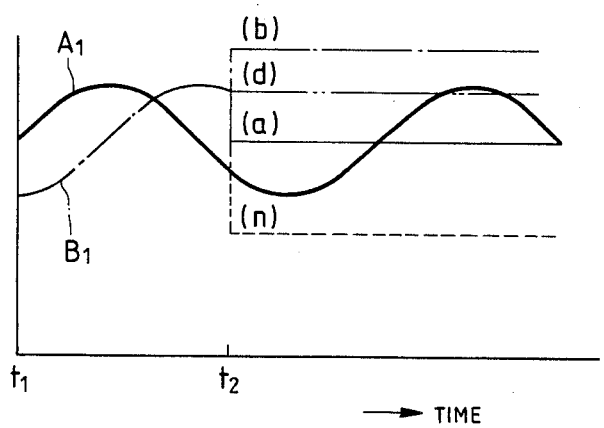
FIG. 17 is diagrams of detection of a fault according to the present invention.

As is seen from these examples of employment, any fault of the torque sensor (TS) causes a false operation of the driving force assisting apparatus, thus bringing forth a great danger. FIG. 17 shows an example of determining the fault of the torque sensor (TS) to take a step for safety quickly. This figure shows the waveforms of the signals $A_1$ and $B_1$ of FIG. 11.

The signals $A_1$ and $B_1$ appear normally between the times $t_1$ and $t_2$ and the signal $B_1$ turns faulty due to a fault at the time $t_2$ in this example. Values of the output are varied from (a) to (n) according to the cause of the abnormality, and the output ceases to vary when the abnormality occurs. In contrast, the signal $A_1$ continues to give a normal output.

Accordingly, the occurrence of the fault can be detected by checking that the signal $B_1$ is not varied while the signal $A_1$ is varied. The same can be detected also by checking a state of variation of the signal $A_1$ while the signal $B_1$ is varied.

Figure 18:
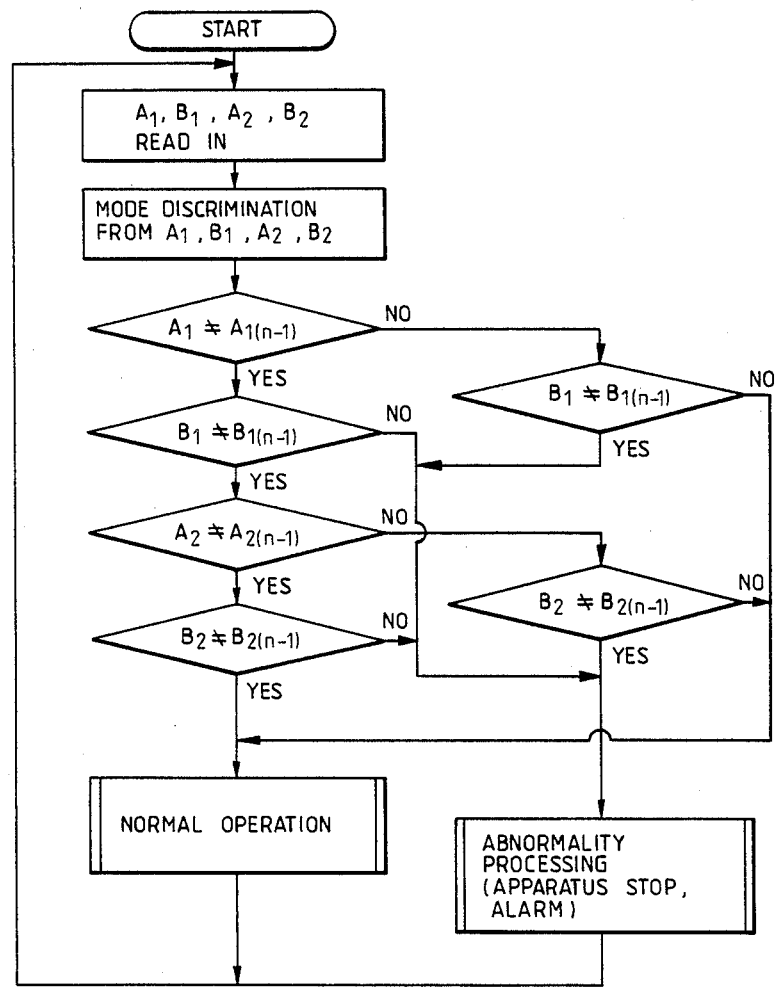
FIG. 18 is a flow-chart of detection of a fault according to the present invention.

FIG. 18 is a flow-chart for detecting an abnormality. First the signals $A_1$ and $B_1$ are taken in, and a mode is determined from each signal. Next, values $A_{1(n-1)}$ and $B_{1(n-1)}$ of the previous signals stored in a memory are compared sequentially with the present values. A determination of normal operation is made when both signals are varied or when neither of them is varied, and the calculation of a normal torque is conducted so as to execute normal driving.

When the comparison of the signals $A_1$ and $B_1$ with the previous values shows that one of them is varied while the other is not varied, either one of the signals is determined to be abnormal, and processing to cope with the abnormality is executed. The same operation is conducted also with regard to the signals $A_2$ and $B_2$.

Figure 19:
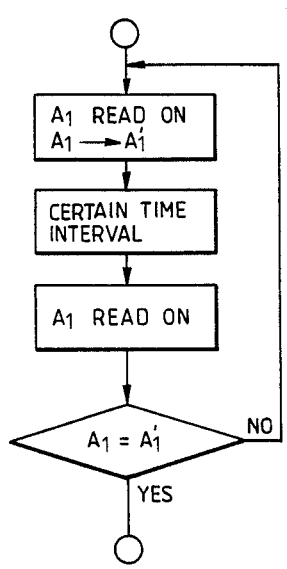
FIG. 19 is a flow-chart of one embodiment of a countermeasure to noise according to the present invention.

FIG. 19 is a flow-chart for preventing the determination of abnormality due to electric noise. According to this flow-chart, the signal $A_1$ or $B_1$ is read twice at a certain short time interval, and the determination of abnormal operation is made when the values thereof are equal substantially, while the determination of the sensor affected by noise is made when the values are different by a large amount. In the latter case, the determination of abnormal operation is not made and a return is made to the start.

Figure 20:
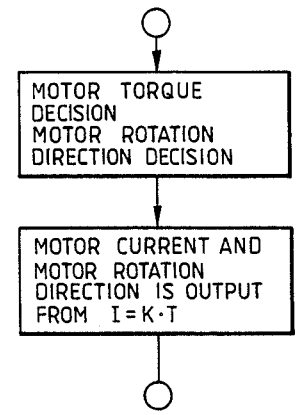
FIG. 20 is a flow-chart of a normal operation of one embodiment of assist for an electric driven power steering construction of an automobile.

FIG. 20 shows a sequence of normal operations in the case when it is applied to the driving force assisting apparatus shown in FIG. 16, that is, to the assistance of steering of an automobile. In normal operation, the torque of a motor is decided and the direction of rotation of the motor is determined in accordance with an output of the torque sensor, and subsequently a current is made to flow through the motor and the direction of rotation is outputted.

Figure 21:
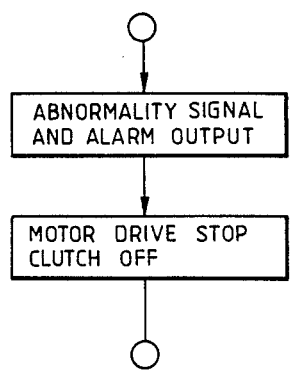
FIG. 21 is a flow-chart of an abnormality processing of one embodiment of assist for an electric driven power steering construction of the automobile.

FIG. 21 shows one example of processing in the case of an abnormality when the driving force assisting apparatus is used for a steering force assisting control apparatus of the same automobile. First an abnormality signal and an alarm are outputted. Then, driving of the motor is stopped, and simultaneously a clutch fitted onto the load side is released so that the motor may not cause a load on steering.

Figure 22:
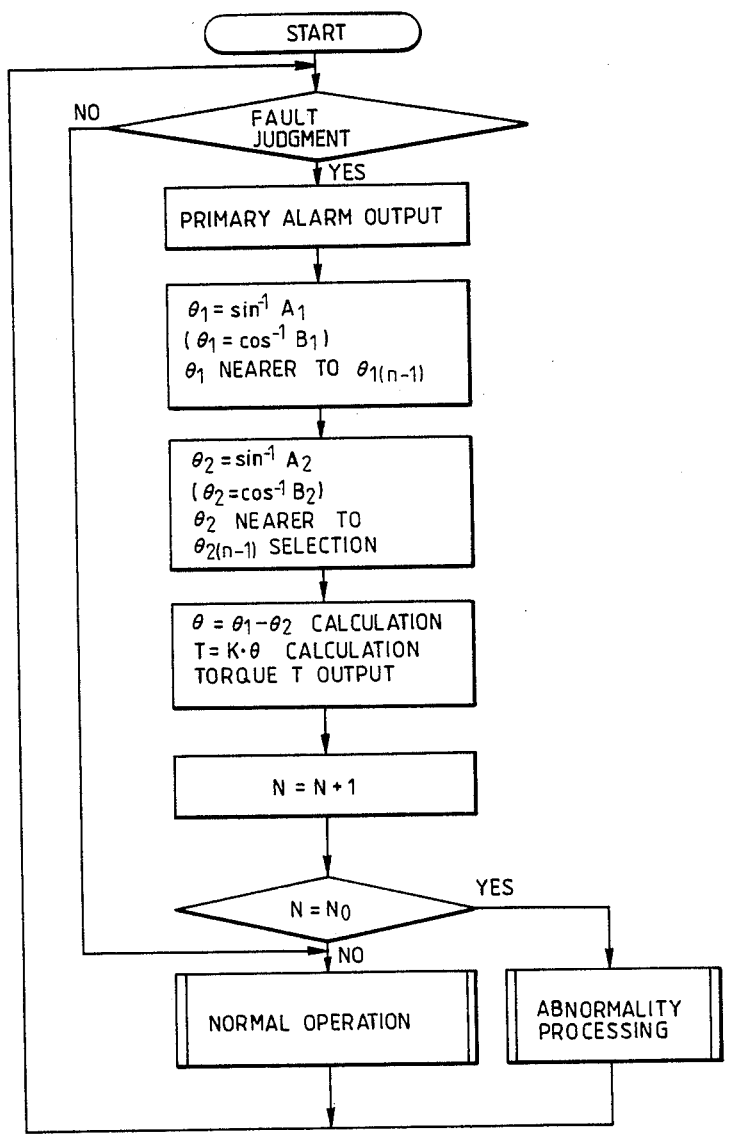
FIG. 22 is a flow-chart of another embodiment covering a procedure from judgment of a fault to the abnormality processing according to the present invention.

FIG. 22 is a flow-chart of the case when the stop is not made at once even when an abnormality occurs, a torque being detected for some time only by signals of one magnetic sensor, and the processing for the abnormality being executed after some time passes.

First, the determination of a fault is made by a method as shown in FIG. 18, and when the fault is determined to be present, a primary alarm is outputted. Next, the value $\theta_1$ is calculated by using the signal $A_1$ or $B_1$ not being faulty. Although modes can not be discriminated due to the fault of one output and consequently two values of $\theta_1$ come out, the value nearer to a value of $\theta_{1(n-1)}$ used in the preceding calculation is selected as $\theta_1$. Then, $\theta_2$ is calculated in the same way, the difference $\theta$ between the two angles $\theta_1$ and $\theta_2$ is calculated, and a torque is calculated therefrom.

Subsequently, the number N in the preceding time is made to be (N+1), and it is checked whether N becomes a certain number $N_0$ or not. The abnormality processing is executed when N is $N_0$, while a normal operation is conducted when N is less than $N_0$.

According to this method, the motor is not stopped immediately even when a fault occurs, however it is stopped gradually with a time for preparation secured. Therefore, it may be said that this method is a safe and practical method.

Figure 23:
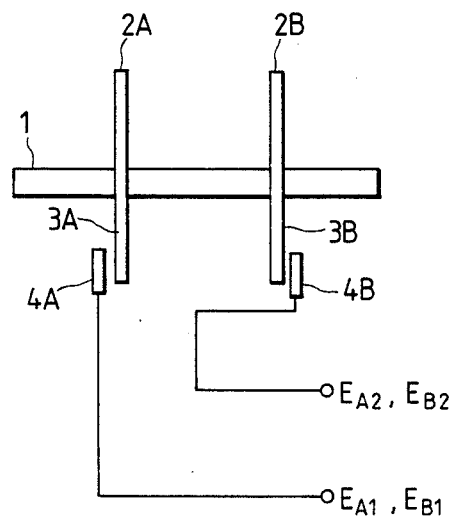
FIG. 23 is a schematic structural view of still another embodiment of a torque detecting apparatus according to the present invention

FIG. 23 shows an example of employment of magnetic discs. In this example, the magnetic disks are fixed on the right and left of a shaft, and the positions of the disks are detected by two magnetic sensors facing them respectively.

We claim:

1. A torque detecting apparatus comprising a first rotary body fitted on a drive side of a rotating drive shaft, a second rotary body fitted on a load side of said rotating drive, a first position detecting means disposed opposite to and facing said first rotary body, a second position detecting means disposed opposite to and facing said second rotary body, said first position detecting means generates a first output and a second output corresponding to positions of rotation of said first rotary body, said second position detecting means generates a third output and a fourth output corresponding to positions of rotation of said second rotary body, and a torque calculating means for calculating a first angle from said first output and said second output, for calculating a second angle from said third output and said fourth output, and further for calculating a torque from a phase difference between said first angle and said second angle, wherein said torque detecting apparatus further comprises a means for determining a fault and for outputting an abnormality signal when one of said first output and said second output is determined to be faulty, wherein said one of said first output and said second output is not varied while the other output of said first output and said second output is varied.

2. A torque detecting apparatus according to claim 1, wherein one of said first output and said second output in said first rotary body is a sine-wave output and the other output is a cosine-wave output.

3. A torque detecting apparatus according to claim 2, wherein a quotient of said sine-wave output and said cosine-wave output is determined when the first angle of said first rotary body is calculated.

4. A torque detecting apparatus according to claim 3, wherein when one of said sine-wave output and said cosine-wave output is not varied while the other is varied, said one output is determined to be faulty and said abnormality signal is then generated.

5. A torque detecting apparatus according to claim 1, wherein said first rotary body comprises a magnetic drum or a magnetic disc, and said first position detecting means comprises an angular detecting sensor for magnetically detecting an angular position of said first rotary body.

6. A torque detecting apparatus according to claim 5, wherein said angular detecting sensor comprises at least four sets of first and second magneto-resistance effect element arrays having magneto-resistance effect elements separated by an electrical angle of $n\pm\gamma/6$ from each other respectively and a third magneto-resistance effect element array delivering a reference signal, the respective sets of each of said first and said second magneto-resistance effect element arrays are separated by an electrical angle of $n\pm\gamma/4$ from each other, and wherein two sets of each of said arrays which are separated by $n\pm\gamma/4$ from each other are spaced by an electrical angle of $n\pm\gamma/2$ from two other sets of each of said arrays which are separated by $n\pm\gamma/4$ from each other, wherein n is an integer and $\gamma$ is a wavelength of an output waveform of said angular detecting sensor.

7. A torque detecting apparatus according to claim 1, wherein said first output and said second output of said first rotary body are obtained by said determining means and are compared with respective first and second predetermined values, and if said first output and said second output are not substantially equal to said respective first and second predetermined values, said first output and said second output are determined to be noise, a determination of a fault is not made, and said first output and said second output are again obtained by said determining means.

8. A torque detecting apparatus according to claim 1, further comprising an alarm means for giving an alarm when one of said first output and said second output is determined to be faulty.

9. A torque detecting apparatus comprising a first rotary body fitted on a drive side of a rotating drive shaft, a second rotary body fitted on a load side of said rotating drive shaft, a first position detecting means disposed opposite to and facing said first rotary body, a second position detecting means disposed opposite to and facing said second rotary body, said first position detecting means generates a first output and a second output corresponding to positions of rotation of said first rotary body, said second position detecting means generates a third output and a fourth output corresponding to positions of rotation of said second rotary body, and a torque calculating means for calculating a first angle from said first output and said second output, for calculating a second angle from said third output, and said fourth output, and further for calculating a torque from a phase difference between said first angle and said second angle, wherein said torque detecting apparatus further comprises a means for determining a fault and for outputting an abnormality signal when one of said third output and said fourth output is determined to be faulty, wherein said one of said third output and said fourth output in said second rotary body is not varied while the other output of said third output and said fourth output in said second rotary body is varied.

10. A torque detecting apparatus according to claim 9, wherein one of said third output and said fourth output in said second rotary body is a sine-wave output and the other is a cosine-wave output.

11. A torque detecting apparatus according to claim 10, wherein a quotient of said sine-wave output and said cosine-wave output is determined when the second angle of said second rotary body is calculated.

12. A torque detecting apparatus according to claim 11, wherein when one of said sine-wave output and said cosine-wave output is not varied while the other is varied, said one output is determined to be faulty and said abnormality signal is then generated.

13. A torque detecting apparatus according to claim 9, wherein said second rotary body comprises a magnetic drum or a magnetic disc, and said second position detecting means comprises an angular detecting sensor for magnetically detecting an angular position of said second rotary body.

14. A torque detecting apparatus according to claim 13, wherein said angular detecting sensor comprises at least four sets of first and second magneto-resistance effect element arrays having magneto-resistance effect elements separated by an electrical angle of $n\pm\gamma/6$ from each other respectively and a third magneto-resistance effect element array delivering a reference signal, the respective sets of each of said first and said second magneto-resistance effect element arrays are separated by an electrical angle of $n\pm\gamma/4$ from each other, and wherein two sets of each of said arrays which are separated by $n\pm\gamma/4$ from each other are spaced by an electrical angle of $n\pm\gamma/2$ from two other sets of each of said arrays which are separated by $n\pm\gamma/4$ from each other, wherein n is an integer and $\gamma$ is a wavelength of an output waveform of said angular detecting sensor.

15. A torque detecting apparatus according to claim 9, wherein said third output and said fourth output of said second rotary body are obtained by said determining means and are compared with respective third and fourth predetermined values, and if said third output and said fourth output are not substantially equal to said respective third and fourth predetermined values, said third output and said fourth output are determined to be noise, a determination of a fault is not made, and said third output and said fourth output are again obtained by said determining means.

16. A torque detecting apparatus according to claim 9, further comprising an alarm means for giving an alarm when one of said third output and said fourth output is determined to be faulty.

17. A torque controlling apparatus for an electric driven power steering apparatus comprising a rotating drive shaft to which a driving force is provided, a first rotary body fitted on a drive side of said rotating drive shaft, a second rotary body fitted on a load side of said rotating drive shaft, a first magnetic angular sensor disposed opposite to and facing said first rotary body, a second magnetic angular sensor disposed opposite to and facing said second rotary body, said first magnetic angular sensor generates a first output and a second output corresponding to positions of rotation of said first rotary body, said second magnetic angular sensor generates a third output and a fourth output corresponding to positions of rotation of said second rotary body, a torque calculating means for calculating a first angle from said first output and said second output and for calculating a second angle from said third output and said fourth output and further for calculating a torque from a phase difference between said first angle and said second angle, and a control means for controlling an assist torque means which generates an assist torque to be given to the load side of said rotating drive shaft in response to an output of said torque calculating means wherein said torque detecting apparatus further comprises a means for determining a fault in response to said first output and said second output, said fault being determined when one of said first output and said second output is varied while the other of said first output and said second output is not varied, and said assist torque means is made ineffective in response to the determination of said fault.

18. A torque controlling apparatus for an electric driven power steering apparatus according to claim 17, further comprising an alarm means for giving an alarm when one of said first output and said second output is determined to be faulty.

19. A torque controlling apparatus for an electric driven power steering apparatus according to claim 17, wherein one of said first output and said second output in said first rotary body is a sine-wave output and the other is a cosine-wave output.

20. A torque controlling apparatus for an electric driven power steering apparatus according to claim 19, wherein a quotient of said sine-wave output and said cosine-wave output is determined when the first angle of said first rotary body is calculated.

21. A torque controlling apparatus for an electric driven power steering apparatus according to claim 19, wherein when one of said sine-wave output and said cosine-wave output is not varied while the other is varied, the output not varied is determined to be faulty, an abnormality signal is generated and said assist torque means is made ineffective.

22. A torque controlling apparatus for an electric driven power steering apparatus according to claim 17, wherein said first output and said second output of said first rotary body are obtained by said determining means and are compared with respective first and second predetermined values, and if said first output and said second output are not substantially equal to said respective first and second predetermined values, said first output and said second output are determined to be noise, a determination of a fault is not made, and said first output and said second output are again obtained by said determining means.

23. A torque controlling apparatus for an electric power steering apparatus according to claim 17, wherein said rotating drive shaft is a steering wheel shaft of an automobile, said drive shaft side is a steering wheel side and said load side is a tire side, said assist torque means comprises a motor which provides an assist to a steering force.

24. A torque controlling apparatus for an electric driven steering apparatus according to claim 23, wherein said motor is cut off from said rotating drive shaft when said torque detecting apparatus is determined to be abnormal.

25. A torque controlling apparatus for an electric driven power steering apparatus according to claim 17, wherein said magnetic angular sensor comprises at least four sets of first and second magneto-resistance effect element arrays having magneto-resistance effect elements separated by an electrical angle of $n\pm\gamma/6$ from each other respectively and a third magneto-resistance effect element array delivering a reference signal, the respective sets of each of said first and said second magneto-resistance effect element arrays being separated by an electrical angle of $n\pm\gamma/4$ from each other, and wherein two sets of each of said arrays which are separated by $n\pm\gamma/4$ from each other are spaced by an electrical angle of $n\pm\gamma/2$ from two other sets of each of said arrays which are separated by $n\pm\gamma/4$ from each other, wherein n is an integer and $\gamma$ is a wavelength of an output waveform of said magnetic angular sensor.

26. A torque controlling apparatus for an electric driven power steering apparatus comprising a rotating drive shaft to which a driving force is provided, a first rotary body fitted on a drive side of said rotating drive shaft, a second rotary body fitted on a load side of said rotating drive shaft, a first magnetic angular sensor disposed opposite to and facing said first rotary body, a second magnetic angular sensor disposed opposite to and facing said second rotary body, said first magnetic angular sensor generates a first output and a second output corresponding to positions of rotation of said first rotary body, said magnetic angular sensor generates a third output and a fourth output corresponding to positions of rotation of said second rotary body, a torque calculating means for calculating a first angle from said first output and said second output and for calculating a second angle from said third output and said fourth output and further for calculating a torque from a phase difference between said first angle and said second angle, and a control means for controlling an assist torque means which generate an assist torque to be given to the load side of said rotating device shaft in response to an output of said torque calculating means wherein said torque detecting apparatus further comprises a means for determining a fault in response to said third output and said fourth output, said fault being determined when one of said third output and said fourth output is varied while the other of said third output and said fourth output is not varied, and said assist torque means is made ineffective in response to the determination of said fault.

27. A torque controlling apparatus for an electric driven power steering apparatus according to claim 26, further comprising an alarm means for giving an alarm when one of said third output and said fourth output is determined to be faulty.

28. A torque controlling apparatus for an electric driven power steering apparatus according to claim 26, wherein one of said third output and said fourth output in said second rotary body is a sine-wave output and the other is a cosine-wave output.

29. A torque controlling apparatus for an electric driven power steering apparatus according to claim 28, wherein a quotient of said sine-wave output and said cosine-wave output is determined when the second angle of said second rotary body is calculated.

30. A torque controlling apparatus for an electric driven power steering apparatus according to claim 28, wherein when one of said sine-wave output and said cosine-wave output is not varied while the other is varied, the output not varied is determined to be faulty, an abnormality signal is generated and said assist torque means is made ineffective.

31. A torque controlling apparatus for an electric driven power steering apparatus according to claim 26, wherein said third output and said fourth output of said second rotary body are obtained by said determining means and are compared with respective first and second predetermined values, and if said third output and said fourth output are not substantially equal to said respective first and second predetermined values, said third output and said fourth output are determined to be noise, a determination of fault is not made, and said third output and said fourth output are again obtained by said determining means.

32. A torque controlling apparatus for an electric power steering apparatus according to claim 26, wherein said rotating drive shaft is a steering wheel shaft of an automobile, said drive shaft side is a steering wheel side and said load side is a tire side, said assist torque means comprises a motor which provides an assist to a steering force.

33. A torque controlling apparatus for an electric driven power steering apparatus according to claim 32, wherein said motor is cut off from said rotating drive shaft when said torque detecting apparatus is determined to be abnormal.

34. A torque controlling apparatus for an electric driven power steering apparatus according to claim 26, wherein said magnetic angular sensor comprises at least four sets of a first and a second magneto-resistance effect element arrays having magneto-resistance effect elements separated by an electrical angle of $n \pm \gamma/6$ from each other respectively and a third magneto-resistance effect element array delivering a reference signal, the respective sets of each of said first and said second magneto-resistance effect element arrays being separated by an electrical angle of $n \pm \gamma/4$ from each other, and wherein two sets of each of said arrays which are separated by $n \pm \gamma/4$ from each other are spaced by an electrical angle of $n \pm \gamma/2$ from two other sets of each of said arrays which are separated by $n \pm \gamma/4$ from each other, wherein n is an integer and $\gamma$ is a wavelength of an output waveform of said magnetic annular sensor.

* * * * *